US009533335B2

United States Patent
Della Vedova et al.

(10) Patent No.: US 9,533,335 B2
(45) Date of Patent: Jan. 3, 2017

(54) APPARATUS TO DETECT THE DEFORMITY IN THICKNESS OF TUBULAR ELEMENTS AND CORRESPONDING METHOD

(71) Applicant: DANIELI AUTOMATION SPA, Buttrio (IT)

(72) Inventors: Ferruccio Della Vedova, Pozzuolo del Friuli (IT); Lorenzo Ciani, Udine (IT)

( * ) Notice: Subject to any disclaimer, the term of this patent is extended or adjusted under 35 U.S.C. 154(b) by 0 days.

(21) Appl. No.: 14/410,423

(22) PCT Filed: Jun. 18, 2013

(86) PCT No.: PCT/IB2013/001271
§ 371 (c)(1),
(2) Date: Dec. 22, 2014

(87) PCT Pub. No.: WO2013/190360
PCT Pub. Date: Dec. 27, 2013

(65) Prior Publication Data
US 2015/0336145 A1    Nov. 26, 2015

(30) Foreign Application Priority Data

Jun. 20, 2012 (IT) .............................. UD2012A0115

(51) Int. Cl.
| | | |
|---|---|---|
| B21B 38/04 | (2006.01) | |
| B21B 17/14 | (2006.01) | |
| B21B 31/02 | (2006.01) | |
| G01B 7/06 | (2006.01) | |
| B21B 37/78 | (2006.01) | |

(52) U.S. Cl.
CPC ............... *B21B 38/04* (2013.01); *B21B 17/14* (2013.01); *B21B 31/02* (2013.01); *G01B 7/107* (2013.01); *B21B 37/78* (2013.01)

(58) Field of Classification Search
CPC .......... B21B 17/14; B21B 31/02; B21B 38/04; B21B 2038/004; B21B 37/78; G01B 7/107
See application file for complete search history.

(56) References Cited

U.S. PATENT DOCUMENTS 4,196,607 A    4/1980  Tatum

FOREIGN PATENT DOCUMENTS

| | | |
|---|---|---|
| DE | 1059672 B | 6/1959 |
| EP | 1611969 A1 | 1/2006 |
| JP | 2000 126805 A | 5/2000 |
| WO | 2012014026 A1 | 2/2012 |

OTHER PUBLICATIONS

International Search Report and Written Opinion From PCT/IB2013/001271 Mailed Sep. 9, 2013.

*Primary Examiner* — Teresa M Ekiert
(74) *Attorney, Agent, or Firm* — Calfee, Halter & Griswold LLP

(57) ABSTRACT

Apparatus to detect a deformity in thickness of a tubular element. The apparatus comprises a plurality of sensors and is installed in at least a rolling stand, having at least three rolling rings, of a rolling train able to obtain said tubular element.

11 Claims, 3 Drawing Sheets

APPARATUS TO DETECT THE DEFORMITY IN THICKNESS OF TUBULAR ELEMENTS AND CORRESPONDING METHOD

CROSS-REFERENCE TO RELATED APPLICATIONS

This application is the U.S. national phase entry of PCT/IB2013/001271, with an international filing date of 18 Jun. 2013, which claims the benefit of Italian Application Serial No. UD2012A000115, with a filing date of 20 Jun. 2012, the entire disclosures of which are fully incorporated herein by reference.

FIELD OF THE INVENTION

The present invention concerns an apparatus, and the corresponding method, to detect the deformity in thickness of tubular elements, in particular weldless tubular elements, during their production in rolling trains or lines.

In particular, the present invention is applied in a rolling line to detect the thickness of the tubular element over its whole section, and possibly make it uniform, in order to guarantee that the dimensional values of the final product are respected and to obtain a product with optimum quality characteristics.

BACKGROUND OF THE INVENTION

One of the known methods for producing weldless tubular elements consists, in a first step, of working a solid profile so as to obtain the hole, by means of a mandrel. The next step consists of reducing the measurement of the section of the tubular element to the desired value. This operation is normally carried out by passing the tubular element through one or more rolling stands, each mainly consisting of at least three rolling rings disposed at 120° with respect to each other and made to rotate by respective shafts. The rolling rings have a peripheral surface shaped as the profile of an arc of a circumference that defines a rolling surface to define part of, or substantially all, the external profile of the tubular element.

This process can mainly cause two types of problem for the quality of the tubular element, both connected to a deformity in thickness.

A first problem concerns a deformity in thickness due to the eccentricity of the mandrel, during the making of the axial hole, with respect to the nominal section of the tubular element to be made.

A second problem concerns a deformity in thickness not due to eccentricity between hole and section but due to localized circumferential variations in the thickness of the tubular element. These variations derive from two situations.

A first situation is connected to the presence or absence of constant contact of the surface of each rolling ring with the external surface of the rolled product.

The second situation concerns the fact that the rolling rings are independent of each other and each ring defines, with respect to the adjacent one, a discontinuity that is mirrored in the development of the surface of the tubular element, in particular on its internal surface, generating a so-called "daisy" section profile of the tubular element.

The deformity in thickness of the final product can therefore derive both from a starting defect, connected to the eccentricity of the mandrel with respect to the nominal sizes of the tubular element, and also from a defect in rolling, connected to the motion and action of the three rolling rings that are independent of each other but work the same piece simultaneously.

In any case, the deformity in thickness has a negative influence on the quality of the whole working, following passes through several rolling stands. Furthermore, the resistance and performance of the tube when in use can also be affected.

Different methods or systems are known to detect the thickness of a tubular element during production and try to make it uniform, adopting correction systems downstream of the rolling line or downstream of a corresponding rolling unit or rolling stand.

One of the known systems provides to use a detection apparatus that works by means of an X-ray radiation principle, and uses one or more transmitter probes and one or more receiving probes, between which the tubular element is made to transit. According to the radiation captured by the receiving probe after the tubular element has passed through, an electric current is generated that is processed and digitized by a measuring transducer and subsequently sent to a central processing system to calculate the thickness of the wall of the tubular element.

Normally, a plurality of transmitter probes and receiving probes are disposed uniformly around the circumference defining the external diameter of the tubular element.

One disadvantage of this technique is its complexity, since the indication obtained for each pair of X-ray probes is the sum of two thickness contributions, corresponding to two opposite parts, or thicknesses, of the cross section of the tubular element, so that it is impossible to know directly and certainly whether the thickness of the tubular element is uniform over the whole circumference, since even if the detections of the probes are identical, the thickness may not be uniform between one part and the other of the tubular element.

Another system provides to use laser and ultrasound technology. In this case, a transmitter probe emits a pulsing laser that generates an ultrasonic wave which propagates from outside to inside the thickness of the tubular element, is subsequently reflected by the internal surface of the tubular element and then returns toward its external surface. A laser interferometer, inspecting the external surface of the tubular element, determines the time taken by the ultrasonic wave to twice pass through the thickness of the tubular element, that is, in an out-and-return travel. Since the speed of propagation of the ultrasonic wave is known, the system is able to deduce the thickness of the tubular element as a function of the passage time measured.

In this case, the detection refers to the portion of thickness cooperating with the probes.

This detection technique also provides the movement and partial rotation of the support parts of the probes, for example by means of automatic mechanical arms, to obtain the detection of the measurement on several surface portions of the tubular element so as to substantially cover the whole circumference thereof.

One disadvantage of this known technique is the sensitivity of the detection with respect to the position of the transmitter probe and the receiving probe. In fact any displacement thereof, even by a small value, can give an erroneous thickness indication.

Furthermore, the devices described above are in general rather expensive and difficult to manage and to maintain.

Another detection system is similar to the previous one but provides to use an electromagnetic transducer which, since it is able to generate magnetic field impulses, causes ultrasonic waves that are reflected by the surfaces of the tubular element and captured by a receiving probe.

In the last two cases cited, the detection systems also have the disadvantage of being very sensitive to the positioning both of the probes and of the tubular element, which negatively affects reliability.

All the systems described, moreover, entail possible problems in setting and adjusting the position with respect to the axis of the tubular element being detected, so that even a slight dis-axiality can entail quite considerable errors.

Document DE 10 59 672 B (DE'672) describes a device for the continuous control of the thickness of the wall of a non-metal pipe, for example made of plastic, in which at the point of measurement the pipe is supported by an internal support made of ferromagnetic material.

The measurement is obtained by means of unipolar probes, for example 3, disposed at 120° around the circumference of the pipe. Each of the probes, measuring the auto-induction, that is, the angle of loss of a measuring coil, allows to obtain the value of thickness of the wall in contact with the corresponding probe.

The solution described in DE'672 is not suitable to continuously measure the thickness of metal pipes during rolling.

One purpose of the present invention is therefore to obtain an apparatus, and the corresponding method, to detect the deformity in thickness of metal tubular elements, which provides reliable measurement results and which is relatively simple in installation and in functioning.

Another purpose of the present invention is to obtain an apparatus that reduces the incidence of errors deriving from the positioning of the detection elements with respect to the metal tubular element.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, an apparatus to detect a deformity in thickness, which overcomes the limits of the state of the art and eliminates the defects therein, is used to detect the deformity in thickness of a metal tubular element, having an internal surface and an external surface, during its production and in particular during the step of reducing the thickness by rolling and stretching.

The apparatus can be installed in association with one or more rolling stands in a rolling train.

Each rolling stand, as its main elements, has at least three rolling rings disposed at 120° with respect to each other, their circumferences converging toward a zone defined as the gap through which the rolled product passes. The rolling stand also comprises means to adjust the speed of rotation and reciprocal position of the rolling rings.

According to one characteristic of the present invention, the detection apparatus comprises a plurality of sensors disposed circumferentially around the external surface of the tubular element being worked, and maintained, in a position of use, at a certain distance from said external surface. Each of the sensors is associated with at least one of the rolling rings of the rolling stand and comprises at least a transmission element, able to generate a variable magnetic field inside the thickness of the tubular element, and a reception element through which an electric current generated by the variable magnetic field is able to pass.

By the term "associated with the rolling ring" we mean different possible types of configuration.

For example, the sensor can be mounted directly on the support element of the corresponding rolling ring, or it can be mounted on an autonomous support element, mechanically or functionally connected to the support element of the corresponding rolling ring.

In one solution of the invention, the association between the sensors and corresponding rolling rings is such that all the sensors always find themselves at substantially the same distance from the external surface of the tubular element subjected to rolling.

The variable magnetic field generated by the transmission element of each sensor determines the circulation of parasite currents inside a corresponding portion of the thickness of the tubular element. The parasite currents in turn generate another variable magnetic field that hits and is detected by the corresponding reception element, inside which another electric current is generated, which supplies an indication of measurement of the thickness of the corresponding portion of the tubular element of which it is a function.

According to the invention, the principle of the variable magnetic field thus replaces that of the laser in the state of the art, eliminating or at least limiting the disadvantages thereof. In fact, using the variable magnetic field simplifies the detection procedure, in that it defines a less delicate procedure, less sensitive to environmental conditions compared with the laser technique.

With this functioning principle, each of the sensors can detect, without contact, the thickness of the portion of tubular element below or facing each of them, where by portion of tubular element below or facing we mean only the portion of tubular element directly cooperating with the sensor. Therefore, the opposite portion of thickness along a circumference belonging to the section of the tubular element is not involved in the detection of each sensor used in the present invention. Therefore, each sensor detects with good accuracy only one contribution of thickness.

The invention therefore allows to obtain a detection apparatus that is more economical, more reliable and easier to use compared to the solutions of the state of the art.

The sensors, of a known type but normally used to detect the thickness of flat sheet, can be the type having one or more detection coils able to generate and detect magnetic fields. The sensors, as we said, are disposed in direct proximity to the rolling rings, so as to be able to detect possible anomalies in time to remedy them. Furthermore, the very close positioning of the sensors with respect to the rolling rings allows to exploit to the utmost the action of guiding and directing the tubular element performed by elements already present in the stands, without having recourse to auxiliary equipment and additional setting and alignment procedures.

Furthermore, the proximity of each sensor to a corresponding one of the rolling rings allows to understand on which one or ones of the rolling rings it is necessary to act, seeing that at a certain distance from the exit of the rolled product from the rolling rings the rolled product could be subjected to further torsions and/or deformations, leading to possible misleading indications.

In this case it is possible to act in a single and specific manner, for example using the means to adjust of the rolling gap, or on the speed of rotation of one or more of the rolling rings.

According to one form of embodiment of the present invention, each of the sensors is mounted on the support element of each rolling ring.

In the case of rolling stands with three rings, there are therefore three thickness sensors making a first group of sensors, each mounted on the support element of the respective rolling ring.

In the case of rolling stands with four rings, it is possible to provide four sensors, each mounted on the support element of the respective rolling ring.

In another form of embodiment of the present invention, the apparatus comprises a second group of sensors mounted, advantageously in addition to the first group of sensors, on the support elements of the rolling rings, also in some or in all of the interspaces present between one rolling ring and the adjacent one. In one solution, the sensors of the second group can be mounted on autonomous support elements but connected mechanically or functionally to the support elements of the contiguous rolling rings.

In the case of stands with three rolling rings, one solution of the invention provides six sensors disposed, advantageously equidistant with respect to each other, around the external surface of the tubular element, three of which are mounted on the support elements of the rolling rings and the remaining three mounted on autonomous support elements.

In the same way, in the case of stands with four rolling rings, one solution of the present invention provides eight sensors, equidistant from each other, distributed around the external surface of the tubular element.

Thanks to this structural configuration, during the steps when the rolling rings are moved near to or are distanced from the tubular element, the sensors move together with the rolling rings to which they are respectively associated for the entire duration of the rolling process, all remaining disposed, stably over time, at the same distance from the external surface. The coaxiality of the detection system and tubular element is also guaranteed.

Advantageously, from this radially variable disposition, a relative and not absolute measurement is obtained, depending on the distance of the sensors from the external surface of the tubular element. This relative measurement is in any case sufficient to verify the uniform thickness of the tubular element over the entire circumference and entails less sophisticated processing compared with detections obtained with absolute measurements.

The provision of sensors that detect portions of thickness both in correspondence with the rings and also in the interspaces between the rings allows to reliably evaluate variations in thickness generated in correspondence with zones subjected to compression and adjacent zones not subjected to compression, which can cause, in the state of the art, the generation of the so-called "daisy" profile of the tubular element.

The present invention also concerns a rolling stand comprising the detection apparatus described above.

Thanks to this assembly disposition of the sensors and the corresponding coils, the step of detecting the deformity in thickness is performed almost at the same time as the rolling step, on a rolled product not subjected to external influences which can change the detection of the deformity in thickness and make it less reliable.

Another advantage is that re-setting the rolling apparatus, for example to change format, size or other, also determines the simultaneous installation and functioning of the apparatus to detect deformity in thickness. Therefore, the re-setting does not require complicated additional operations.

BRIEF DESCRIPTION OF THE DRAWINGS

These and other characteristics of the present invention will become apparent from the following description of one form of embodiment, given as a non-restrictive example with reference to the attached drawings wherein.

DETAILED DESCRIPTION OF ONE FORM OF EMBODIMENT

Figure 1:
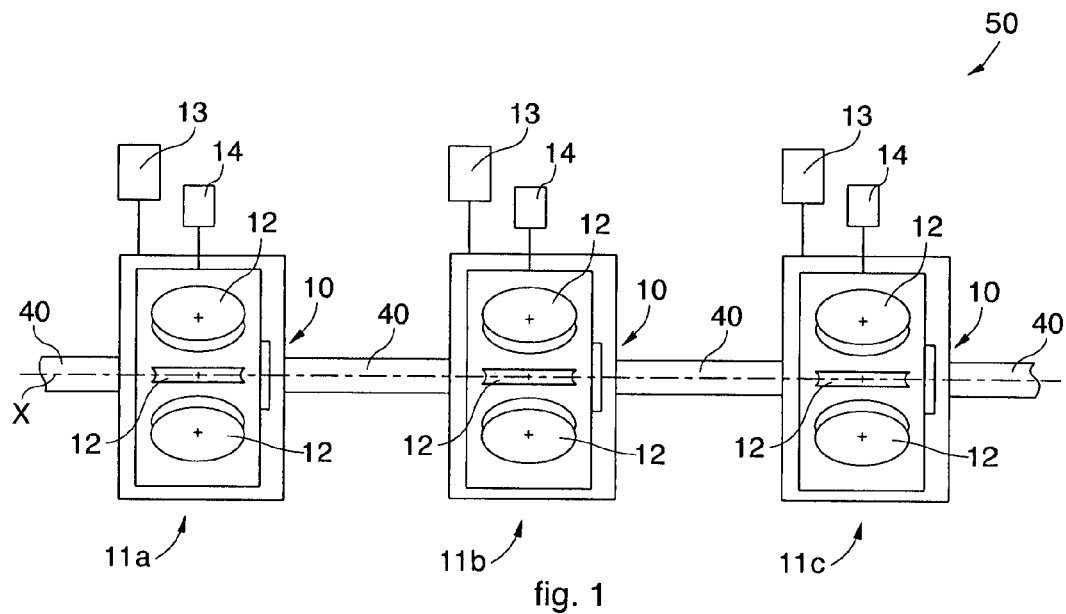
FIG. 1 is a schematic view of the application of a detection apparatus according to the present invention applied to a rolling train.

With reference to FIG. 1, which is only a schematic view, an apparatus 10 to detect the deformity in thickness of a rolled product, in this case a metal tubular element 40, is usable in each rolling stand 11 or rolling module, having three rolling rings 12 disposed at 120° with respect to each other, which as well as executing the rolling proper, also function as guide and feed elements for the tubular element 40.

Each rolling stand 11, respectively 11a, 11b and 11c, is used as a module, to form a rolling train 50 comprising in this case three modules in series. The stands 11 are disposed aligned with each other along a nominal rolling axis X, along which the tubular element 40 moves during working.

Each stand 11, in a known manner, has a motor 13 to move the parts needed for rolling, in particular for the rotation of the rolling rings 12, and adjustment means 14 to adjust at least the speed of the rolling rings 12 and/or the distance between the rolling rings 12, which defines the gap through which the tubular element 40 passes.

In the case of FIG. 1, the invention is applied immediately at exit from the rolling rings 12, so as to perform a detection at exit from every rolling module, preventing possible deformations after rolling between one stand 11 and the next, deformations which could lead to errors and inaccuracy of the measurement.

Figure 2:
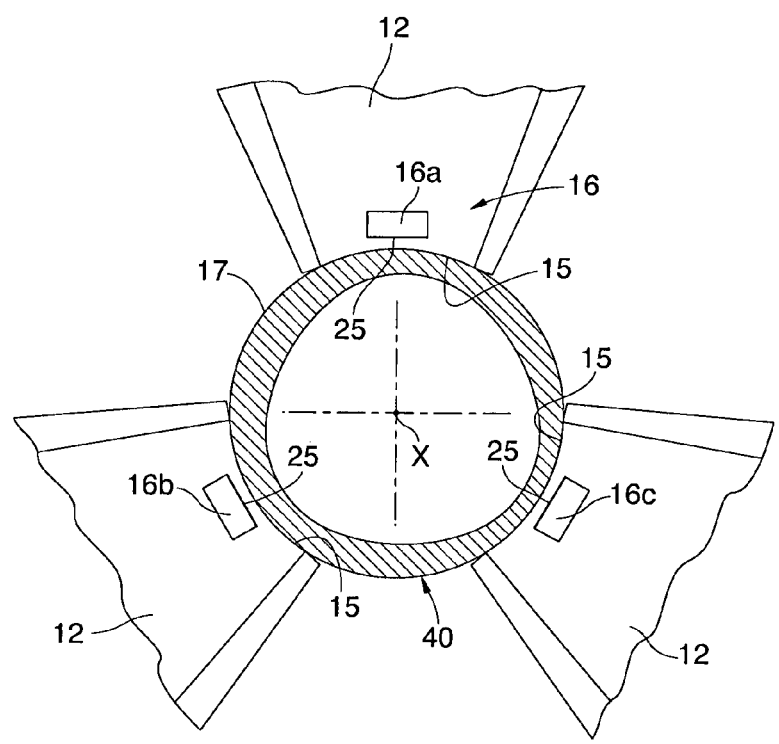
FIG. 2 is a schematic view of one form of embodiment of the apparatus in FIG. 1 according to the present invention.

With reference to FIG. 2, the profile of the rolling rings 12 can be seen in more detail, more precisely the profile of a rolling surface 15 shaped so as to define an external surface 17 of the tubular element 40.

The apparatus 10 in this case is substantially divided into three equal parts. The apparatus 10 comprises three sensors 16, respectively 16a, 16b and 16c, of the electromagnetic and known type, each having a front surface 25 facing a corresponding portion of the external surface 17 of the tubular element 40, and distant from it by a known nominal distance.

Figure 5:
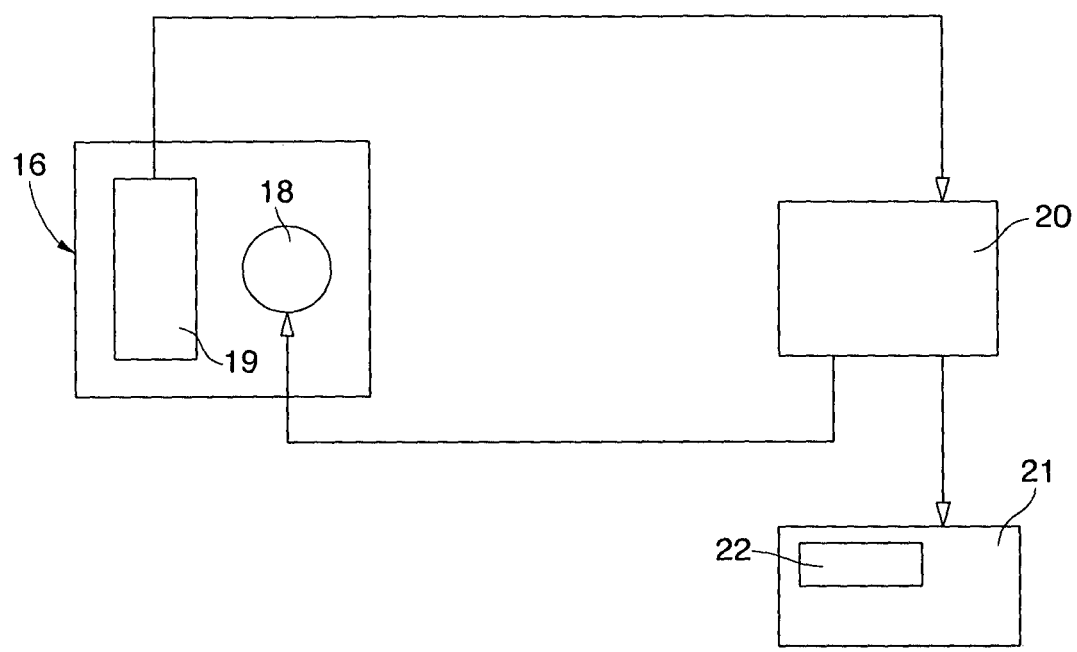
FIG. 5 is a schematic view of one part of the apparatus in FIG. 2.

Each sensor 16 comprises a transmission coil 18 and a reception coil 19 (FIG. 5), to perform a detection on the portion of thickness of the tubular element 40 below it.

A current is sent through the transmission coil 18, using a signal processor 20, to induce on the corresponding portion of the tubular element 40 a flow of variable magnetic field, which generates parasite currents inside the material that makes up the tubular element 40. The parasite currents in turn generate a variable magnetic field that induces a corresponding electric current on the reception coil 19. The detection of the electric current on the reception coil 19 and on the transmission coil 18 allows to detect the thickness of the tubular element 40, in a known manner by means of the signal processor 20. A terminal 21 has the function of displaying the results on a screen 22.

In one form of embodiment of the invention, the measuring principle used by the apparatus described above provides to use two frequencies. The first frequency is such as to render the thickness of penetration into the material that makes up the tubular element 40 negligible, and hence suitable to supply information correlated to the distance between the sensor 16 and the external surface 17 of the tubular element 40. The second frequency, lower than the first, is such as to obtain a penetration thickness equal for example to two or three times the expected thickness of the tubular element 40, and therefore suitable to supply information correlated both to the distance between the sensor 16 and the external surface 17 of the tubular element 40 and also to the thickness of the tubular element 40.

It is therefore possible to detect the thickness of the tubular element 40 as a function of the combination and processing of the information obtained from the two frequencies described above, substantially independently of the position of the sensors 16 with respect to the tubular element 40.

The sensors 16a, 16b and 16c can be mounted directly on the supports of the rolling rings 12, not shown in the drawings. Each of the sensors 16a, 16b and 16c is associated to a rolling ring 12 and has the function of detecting the thickness of the wall of the tubular element 40 below.

Advantageously, mounting the sensors 16a, 16b and 16c on the support of the corresponding rolling ring 12 allows to obtain a positioning of the sensor 16a, 16b and 16c that is closely connected to that of the corresponding rolling ring 12, in order to obtain a constant distance between sensor 16 and external surface 17 of the tubular element 40 being rolled, irrespective of the radial positioning of the rolling ring 12.

For safety reasons, the distance between each sensor 16a, 16b and 16c and the external surface 17 of the tubular element 40 is kept in the range of 3-10 mm. For this reason, the front surface 25 of each sensor 16a, 16b and 16c is at a certain nominal distance, known beforehand, from the external surface 17, unlike the rolling surface 15 which is in contact with the external surface 17.

Thanks to this disposition in association with the rolling rings 12, the sensors 16a, 16b and 16c are angularly equidistant with respect to each other by 120°, and move radially together with the rolling rings 12. In this way, the sensors 16a, 16b and 16c detect the thickness of the tubular element 40 in correspondence with three equidistant points, supplying an indication of the thickness of the portion of the tubular element 40 below the sensor. This configuration therefore allows to detect precisely the development of the eccentricity of the tubular element 40.

If the rolling surfaces 15 do not cover all the external surface 17 of the tubular element 40, other sensors, respectively 16d, 16e and 16f, can also be disposed, in addition to those (16a, 16b and 16c) in correspondence with each rolling ring 12, in the interspaces between one rolling ring 12 and the adjacent one (FIGS. 3 and 4), so as to perform an even more accurate detection.

The presence of the sensors 16a, 16b and 16c and the sensors 16d, 16e and 16f allows to reliably evaluate the variation in thickness of the tubular element 40 in correspondence with zones subjected to compression, that is, those cooperating with the rolling rings 12, and with zones not subjected to compression, that is, those corresponding to the interspaces between the rolling rings 12. The alternation of zones subjected and not subjected to compression can generate, as can be seen from FIGS. 2, 3 and 4, a so-called "daisy" profile of the section of the tubular element.

According to these configurations, the apparatus 10 is prepared at the same time as the rolling rings 12, inasmuch as it is associated with them.

Figure 3:
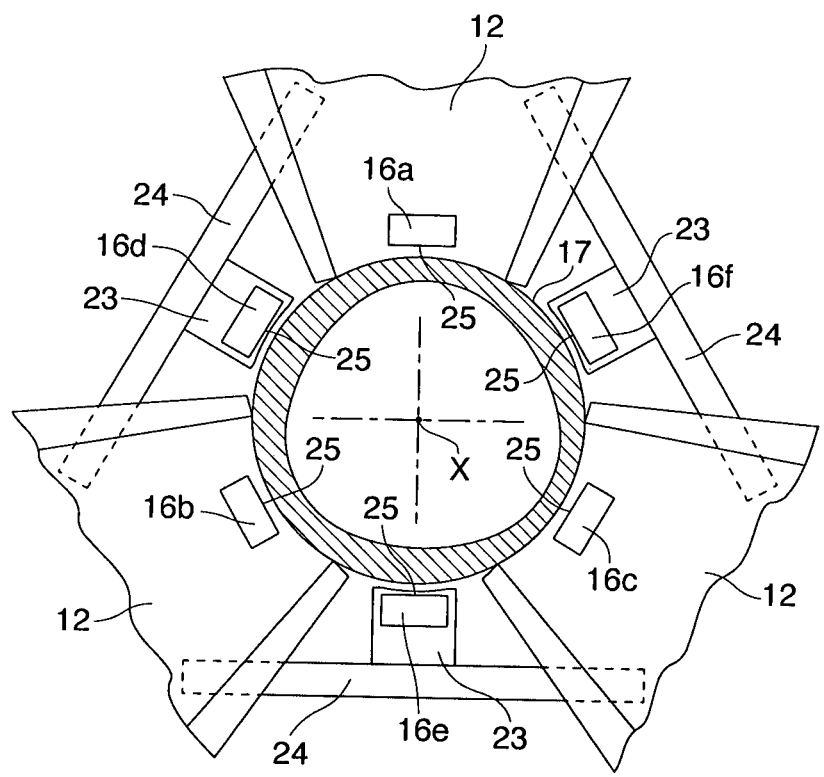
FIG. 3 is a variant of FIG. 2 in a first position.
Figure 4:
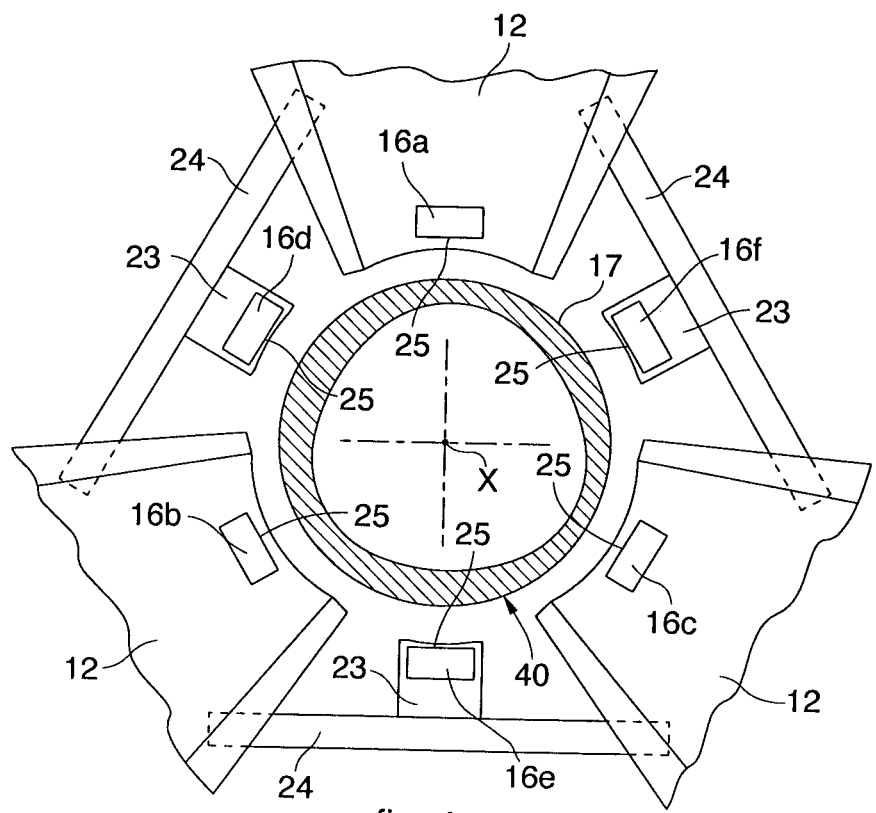
FIG. 4 is the variant of FIG. 3 in a second position.

The sensors 16d, 16e and 16f are advantageously mounted on autonomous support elements 23, which are connected, as shown schematically in FIGS. 3 and 4, to the rolling rings 12, for example by means of connection elements 24 able to slide in suitable guides, not shown in the drawings, made in the rolling rings 12. In this way, when the rolling rings 12 together with the sensors 16a, 16b and 16c move away from the tubular element 40, then the sensors 16d, 16e and 16f also move away, in a reciprocally homogeneous manner, always lying on the same circumference on which the sensors 16a, 16b and 16c lie. The same consideration applies when the sensors 16 are moved closer to the tubular element 40.

In any case, all the sensors 16 are always at the same distance from the external surface 17 of the tubular element 40.

The method to detect a deformity in thickness using the apparatus 10 comprises a step in which rolling proper is carried out, another step in which each of the sensors 16 detects the value of thickness of the portion of tubular element 40 below the sensor 16, a subsequent step in which the signal processor 20 compares the data detected by each of the sensors 16 with the nominal or tolerance values, and a possible further step in which the terminal 21 displays the results on the screen 22. Furthermore, a possible further step provides that, if there is a deformity between the values detected and the nominal or tolerance values, the adjustment means 14 are activated to vary at least the speed of the motors of the rolling rings 12 and/or at least the gap between them.

It is clear that modifications and/or additions of parts may be made to the apparatus 10 as described heretofore, without departing from the field and scope of the present invention. It is also clear that, although the present invention has been described with reference to some specific examples, a person of skill in the art shall certainly be able to achieve many other equivalent forms of apparatus, having the characteristics as set forth in the claims and hence all coming within the field of protection defined thereby.

The invention claimed is:

1. An apparatus to detect a deformity in thickness of a metal tubular element having an external surface wherein said apparatus is installed in a rolling stand having at least three rolling rings and said apparatus comprises:
    a plurality of sensors disposed around said external surface and at a certain distance from said external surface wherein each of said sensors is associated with at least one of said rolling rings;
    a transmission element to generate a variable magnetic field inside a corresponding portion of a thickness of said metal tubular element and;
    a reception element through which an electric current generated by said variable magnetic field passes.

2. The apparatus of claim 1 further comprising a signal processor to detect the value of electric current and to determine the thickness of said metal tubular element.

3. A rolling stand apparatus comprising:
    at least three rolling rings and a metal tubular thickness detection apparatus comprising:
a plurality of sensors disposed around an external surface of a metal tubular element wherein said sensors are associated with at least one of said rolling rings and disposed at a certain distance from said external surface;
a transmission element to generate a variable magnetic field inside a tubular element and;
a reception element through which an electric current generated by said variable magnetic field passes.

4. The rolling stand apparatus of claim 3, wherein the sensors comprises a first group of sensors, wherein at least one of the first group of sensors is mounted to the rolling stand apparatus and in communication with one of the rolling rings.

5. The rolling stand apparatus of claim 4, wherein the sensors further comprises a second group of sensors, wherein at least one of the second group of sensors is mounted to the rolling stand apparatus between one of the rolling rings and its adjacent rolling ring.

6. The rolling stand apparatus of claim 3 wherein the sensors are mounted on a support elements of the rolling ring.

7. The rolling stand apparatus of claim 3 wherein the sensors have a support element and said support element is mounted on a support element of the rolling ring.

8. The rolling stand apparatus of claim 3 wherein said sensors are positioned at distance of at least 3 mm from said external surface of said tubular element.

9. A method to detect a deformity in the thickness of a metal tubular element having an external surface comprising the steps of:
positioning a plurality of sensors around the circumference of the tube and at a certain distance from said external surface of the metal tubular element;
detecting the value of thickness of the portion of tubular element located below the sensor;
comparing the data detected by each of said sensors with known tolerance values, determining if there is a deformity between the values detected by said sensors with respect to the known tolerance values; and
varying the speed of rolling ring motors via an adjustment means.

10. The method of claim 9 further comprising the step of operating a transmission element of the sensor at a first, higher transmission frequency to supply an indication of the distance between the sensor and the external surface of the tubular element and at a second and at a lower transmission frequency to penetrate the thickness of the tubular element and determine the value of thickness passed through.

11. The method of claim 10 further comprising the steps of:
detecting by each sensor a relative value of thickness of the portion of the tubular element below the sensor; and
comparing by a signal processor the relative value detected by one sensor with the relative value detected by another sensor.

* * * * *